United States Patent
Barringer et al.

[11] 3,939,421
[45] Feb. 17, 1976

[54] CIRCUIT FOR INDICATING THE BATTERY VOLTAGE AND OPERATION OF A RADIO TRANSMITTER

[75] Inventors: Jerry M. Barringer, Lynchburg; Raymond W. Harris, Rustburg; John B. Woodward, Lynchburg, all of Va.

[73] Assignee: General Electric Company, Lynchburg, Va.

[22] Filed: Nov. 25, 1974

[21] Appl. No.: 526,698

[52] U.S. Cl. ............ 325/133; 340/248 Y; 340/249; 324/29.5; 320/48
[51] Int. Cl.² ........................................ H04B 17/00
[58] Field of Search ............ 325/67, 113, 133, 363, 325/186; 340/201 R, 201 P, 248 A, 248 B, 248 C, 248 Y, 249, 309.1–309.4; 324/29.5; 320/30, 40, 48

[56] References Cited
UNITED STATES PATENTS

| | | | |
|---|---|---|---|
| 3,102,982 | 9/1963 | Stypulkowski et al. | 325/133 |
| 3,321,754 | 5/1967 | Grimm et al. | 340/249 |
| 3,335,371 | 8/1967 | Yandell | 325/114 |
| 3,349,386 | 10/1967 | Zug | 340/249 |
| 3,412,392 | 11/1968 | Jenkins et al. | 340/248 C |
| 3,546,576 | 12/1970 | Frezzolini | 340/249 |
| 3,550,105 | 12/1970 | De Cola et al. | 340/249 |
| 3,832,629 | 8/1974 | Cernek, Jr. | 340/249 |

*Primary Examiner*—Robert L. Griffin
*Assistant Examiner*—Jin F. Ng
*Attorney, Agent, or Firm*—James J. Williams

[57] ABSTRACT

A single indicator lamp is provided on a personal or portable, battery powered radio transmitter to indicate when the transmitter is operated. The lamp is connected to a circuit which senses the battery voltage (and hence charge), which causes the lamp to be energized constantly if the battery voltage is high, and which causes the lamp to be energized intermittently at a rate which decreases as the battery voltage decreases.

1 Claim, 2 Drawing Figures

CIRCUIT FOR INDICATING THE BATTERY VOLTAGE AND OPERATION OF A RADIO TRANSMITTER

BACKGROUND OF THE INVENTION

Our invention relates to an indicator circuit, and particularly to an indicator circuit that shows the operation and battery voltage of a radio transmitter by a single lamp.

Users of battery powered personal or portable radio transmitters need to know the condition or state of the battery charge so that the battery can be replaced or recharged at the proper time. While a voltmeter can be used to indicate the battery voltage and hence its charge condition, such a meter is relatively expensive and fragile.

Accordingly, a primary object of our invention is to provide a new and improved circuit for indicating the condition or state of battery charge in a personal or portable radio transmitter.

The Federal Communications Commission requires that an indicator lamp be provided in some applications of personal or portable radio transmitters so that the user will have a visual indication of when the transmitter is operated.

Accordingly, another object of our invention is to provide a new circuit that utilizes the required operating indicator lamp of a personal or portable radio transmitter to further indicate the state or condition of the transmitter battery charge.

SUMMARY OF THE INVENTION

Briefly, these and other objects are achieved in accordance with our invention by a circuit which can be connected to the required operating indicator lamp of a personal or portable radio transmitter. The circuit includes means which energize the lamp constantly when the transmitter is operated and when the battery voltage, and hence charge, is above a predetermined magnitude. The circuit further includes a timer which operates at a rate related to the battery voltage, and which intermittently energizes the lamp at this rate when the radio transmitter is operated. Thus, a user will see the lamp energized when the radio transmitter is operated, and will see the lamp energized at a rate related to the battery voltage and hence charge. As the battery charge decreases, the lamp is intermittently energized at a decreasing rate so that the user gets a visual indication of both the transmitter operation and the battery voltage.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF A PREFERRED EMBODIMENT

Figure 1:
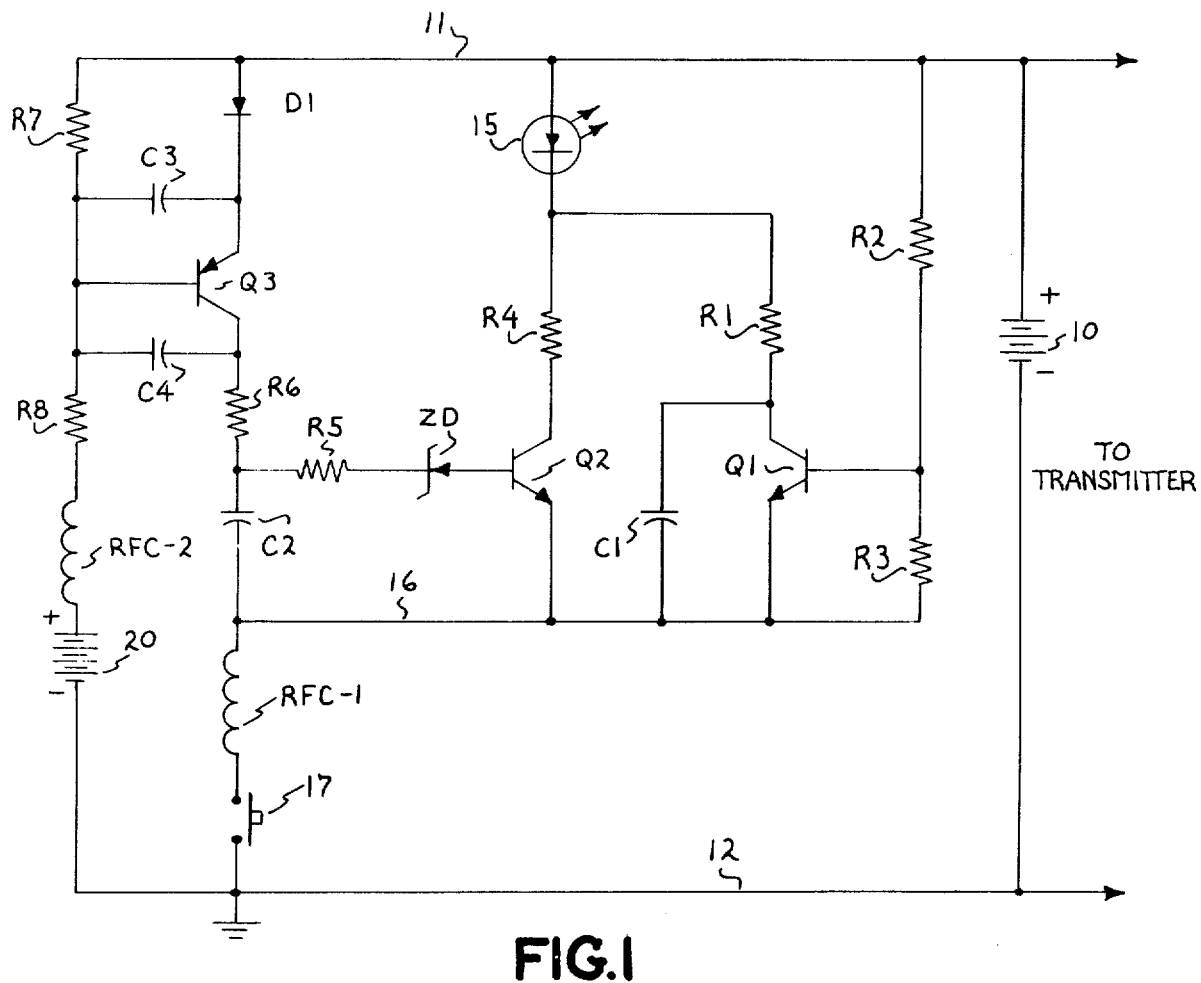
FIG. 1 shows an electrical circuit diagram of an indicator circuit in accordance with our invention.

In FIG. 1, we have shown our circuit connected to a personal or portable radio transmitter battery 10. The positive terminal of the battery 10 is connected to a positive bus 11, and the negative terminal of the battery 10 is connected to a negative or reference bus 12. The negative bus 12 may be connected to ground as shown. The battery 10 is also connected to the radio transmitter through suitable switches, not shown, for energizing the transmitter. Our circuit is also connected to an indicator lamp 15 which, as mentioned, may be and preferably is the already existing and required operating lamp for the transmitter. We have shown the lamp 15 to be a light emitting diode because of its low power requirements, although the lamp 15 may be any type, such as an incandescent lamp. The upper terminal of the lamp 15 is connected to the positive bus 11. The lower terminal of the lamp 15 is connected through two parallel energizing paths to a line 16 and the negative bus 12. The first energizing path comprises a resistor R1 and the collector-emitter path of an NPN type transistor Q1. The emitter of the transistor Q1 is connected to the line 16 which, in turn, is connected through a radio frequency choke RFC-1 and a push-to-talk button 17 to the negative bus 12. The push-to-talk button 17 provides a normally open current path, and when the transmitter is operated, the normally open path is closed. Such a push-to-talk button is usually provided on the microphone switch of the transmitter. This button 17 may also operate other contacts, not shown, for connecting the battery 10 to the transmitter and for operating other circuits in the radio equipment. The transistor Q1 is provided with a bypass capacitor C1, and is also provided with a bias circuit comprising two resistors R2, R3 connected in series between the bus 11 and the line 16. The junction of the resistors R2, R3 is connected to the base of the transistor Q1. The relative magnitudes of the resistors R2, R3 are selected in conjunction with the voltage of the battery 10 so that when the battery voltage exceeds a selected magnitude, indicating a high battery charge condition, the transistor Q1 will be turned on when the push-to-talk button 17 is closed. When the transistor Q1 is turned on, current flows from the bus 11 through the lamp 15, through the resistor R1, and through the collector-emitter path of the transistor Q1 to the line 16 and the negative bus 12. Thus, when the battery voltage is sufficiently high, and when the transmitter is operated, the lamp 15 is energized steadily.

The second energizing path for the lamp 15 comprises a resistor R4 connected in series with the collector-emitter path of an NPN type transistor Q2. The transistor Q2 is controlled by a timer circuit which provides an intermittent turn-on signal at a rate which varies as a function of the battery voltage. The timing element in the timer circuit is a capacitor C2 which receives a charging current through a charging path comprising the emitter-collector path of a PNP type transistor Q3. This charging path also comprises one or more voltage dropping diodes D1 connected between the bus 11 and the emitter of the transistor Q3, and a charging resistor R6 connected between the collector of the transistor Q3 and the upper terminal of the timing capacitor C2. The lower terminal of the capacitor C2 is connected to the line 16. The charge condition of the capacitor C2 is sensed by a resistor R5 and a zener diode ZD connected between the upper terminal of the capacitor C2 and the base of the transistor Q2. As will be explained, when the capacitor C2 receives sufficient charge, its voltage causes the zener diode ZD to break down which, in turn, causes the transistor Q2 to conduct. The capacitor C2 discharges through the base and emitter path of the transistor Q2, after which the transistor Q2 is turned off. During the time the transistor Q2 conducts, the lamp 15 is energized.

The charging current supplied by the transistor Q3 is determined by its base voltage which, in turn, is determined by the voltage supplied by the transmitter battery 10 with respect to a reference voltage indicated by a battery 20. This reference voltage supplied by the battery 20 is compared with the voltage supplied by the transmitter battery 10 through a circuit comprising serially connected resistors R7, R8 and a radio frequency choke RFC-2. The junction of the resistors R7, R8 is connected to the base of the transmitter Q3. Bypass capacitors C3, C4 may be provided. The magnitude of current conducted by the transistor Q3 is determined by its base voltage. This base voltage is determined by the amount by which the voltage of the battery 10 exceeds the voltage of the reference source 20. As the voltage of the transmitter battery 10 decreases, the base voltage of the transistor Q3 decreases. This decreased base voltage causes the current flow through the transistor Q3 to also decrease, so that the timing capacitor C2 receives less charging current, and hence requires a greater length of time to reach the charge voltage needed to turn on the transistor Q2.

Figure 2:
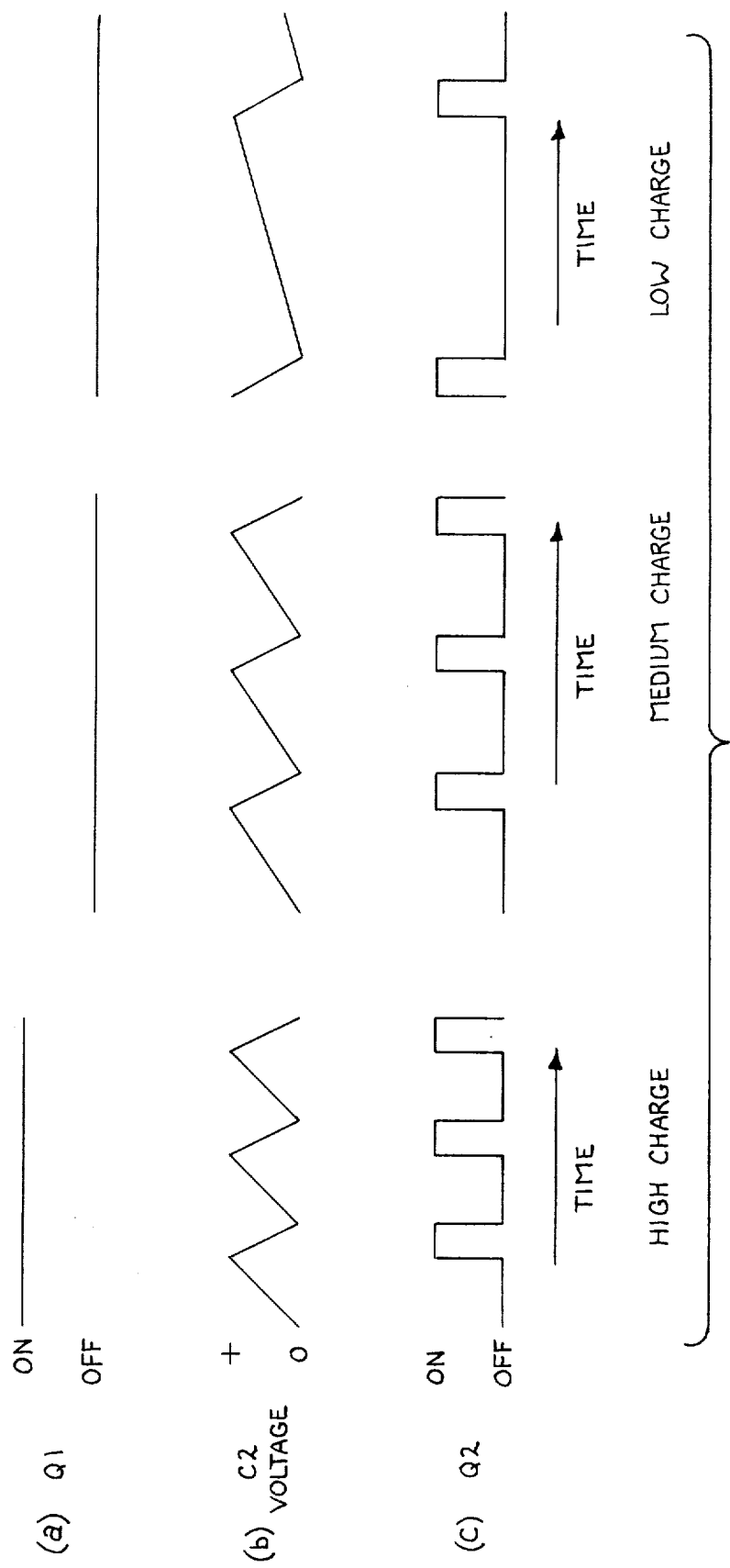
FIG. 2 shows wave forms for illustrating the operation of our circuit of FIG. 1.

The operation of our circuit of FIG. 1 can be better understood by reference to the following explanation in connection with the wave forms shown in FIG. 2. From left to right, FIG. 2 shows three conditions of battery charge, namely a high charge, a medium charge, and a low charge. FIG. 2a shows when the transistor Q1 is turned on and off for these three charge conditions, FIG. 2b shows the voltage across the timer capacitor C2 for these three charge conditions, and FIG. 2c shows when the timer transistor Q2 is on and off for these three charge conditions. With respect to the left wave forms of FIG. 2, when the transmitter battery 10 has a relatively high charge, the voltage produced at the junction of the resistors R2, R3 is sufficient to cause the transistor Q1 to be turned on. Consequently, when the button 17 is closed, the lamp 15 is turned on steadily. However, even though the lamp 15 is on steadily, the capacitor C2 is charged and discharged so that our timer circuit operates during the high charge condition, when the button 17 is closed. Under this condition, the transistor Q3 supplies a relatively large amount of current that causes the capacitor C2 to charge relatively rapidly. When the voltage across the capacitor C2 reaches the magnitude determined by the zener diode ZD, the capacitor C2 discharges through the base and emitter of the transistor Q2, turning the transistor Q2 on so that current also flows through the lamp 15 and the second path comprising the resistor R4 and the collector-emitter path of the transistor Q2. After the capacitor C2 discharges, the transistor Q2 is turned off and the capacitor C2 begins to charge again. Hence, the transistor Q2 is turned on at a relatively rapid rate as indicated in FIG. 2c for the high charge condition, even though the lamp 15 does not show this because the transistor Q1 is on.

In the middle of FIG. 2, we have assumed that the battery has been discharged until it only has a medium charge which results in a voltage which is insufficient to cause the transistor Q1 to be turned on when the button 17 is closed. Hence, for the medium charge wave forms, the transistor Q1 remains turned off when the button 17 is closed, as shown in FIG. 2a. However, when the button 17 is closed, the transistor Q3 conducts, but at a lower current magnitude, so that the capacitor C2 takes longer to charge as indicated in FIG. 2b. When the capacitor voltage C2 reaches the needed breakdown magnitude, it turns the transistor Q2 on and this in turn energizes the lamp 15. The capacitor C2 then discharges, after which the cycle is repeated. The cycles continue at the rate indicated in FIG. 2b for the medium charge condition, and this in turn turns the transistor Q2 and the lamp 15 on and off at the rate indicated. This rate is slower than the high charge rate as will be seen by comparing the wave forms in FIG. 2c.

At the right of FIG. 2, we have assumed a low charge condition so that the current supplied by the transistor Q3 is sufficiently low that the capacitor C2 requires a very long period of time to receive sufficient charge to cause the transistor Q2 to conduct. The transistor Q1 remains off. This long period is indicated by the relatively low slope of the charging voltage for the capacitor C2. When the voltage reaches the needed magnitude, it causes the transistor Q2 to conduct and discharge the capacitor C2. When this occurs, the lamp 15 is energized. However, it will be seen that the rate at which the transistor Q2 and the lamp 15 are energized is relatively slow. This cycle continues at the indicated rate.

It will thus be seen that we provide an indicator circuit which uses an existing indicator lamp, with its advantages over a meter or comparable device, which energizes this lamp at a rate which is proportinal to or varies as a function of the battery voltage and charge. When a person uses his personal or portable radio transmitter, the indicator lamp will not only tell him that his transmitter is operating, but the rate at which the lamp flashes or turns on and off tells the user the battery condition. As this rate decreases, the person will understand or know that his battery voltage and hence charge is decreasing. While we have shown only one embodiment, persons skilled in the art will appreciate that the circuit of FIG. 1 may be modified. For example, various timing circuits may be utilized in place of the capacitor C2 and the zener diode ZD. In particular, it may be preferable to use existing and relatively inexpensive microelectronic circuits, such as timer 555 manufactured by the Signetics Company of Sunnyvale, California. Such a timer is relatively small and inexpensive, and may be connected to the capacitor C2 to provide the desired timing signals for the transistor Q2. And of course the bypass capacitors C1, C3, C4 and the radio frequency chokes RFC-1, RFC-2 may be omitted, or may be supplemented. Various circuits may be used to provide the reference voltage of the battery 20. Therefore, while our invention has been described with reference to one preferred embodiment, it is to be understood that modifications may be made without departing from the spirit of the invention or from the scope of the claims.

What we claim as new and desire to secure by Letters Patent of the United States is:

1. A circuit for indicating the operation of a radio transmitter and the voltage of a battery that powers said transmitter comprising:
   a. a first main terminal for connection to a first terminal of a battery;
   b. a second main terminal;
   c. a switch connected to said second main terminal for connecting said second main terminal to a second terminal of said battery in response to said transmitter being operated;

d. a light emitting device;

e. a first current control device having a first current path and a control electrode;

f. means connecting said light emitting device and said first current path of said current control device in series between said first and second main terminals;

g. a first voltage sensing circuit connected between said first and second main terminals and connected to said control electrode of said first current control device for closing said first current path in response to a voltage of selected magnitude between said first and second main terminals;

h. a second current control device having a second current path and a control electrode;

i. means connecting said second current path in parallel with said first current path;

j. a timing circuit having a capacitor and charging circuit connected between said first and second main terminals, said capacitor being charged at a rate which varies as a function of the magnitude of voltage between said first and second main terminals;

k. a second voltage sensing circuit for supplying charging current to said charge circuit comprising means for comparing the voltage of said battery and a predetermined voltage for providing said charging current and l. means connecting said capacitor to said control electrode of said second current control device for closing said second current path in response to a selected charge voltage on said capacitor, said capacitor being discharged by said closed second current path and said second current path being opened in response to said capacitor being discharged;

whereby said light emitting device is energized steadily by said closed first current path in response to a voltage that exceeds said selected magnitude, and whereby, when said first current path is open, said light emitting device is energized and de-energized by said second current path at a rate determined by the charge and discharge rate of said capacitor.

* * * * *